(12) United States Patent
Yumoto et al.

(10) Patent No.: US 7,324,886 B2
(45) Date of Patent: Jan. 29, 2008

(54) POWERTRAIN CONTROL APPARATUS AND METHOD

(75) Inventors: Takashi Yumoto, Okazaki (JP);
Tadashi Tamura, Nishikamo-gun (JP);
Akira Hino, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/716,715

(22) Filed: Mar. 12, 2007

(65) Prior Publication Data
US 2007/0255472 A1    Nov. 1, 2007

(30) Foreign Application Priority Data
Apr. 11, 2006    (JP)    .............................. 2006-108836

(51) Int. Cl.
*G06F 17/00*    (2006.01)
(52) U.S. Cl. ........................ 701/67; 192/3.29; 701/51; 701/112
(58) Field of Classification Search ................ 701/51, 701/53, 54, 64, 67, 101, 112, 115; 477/169–181; 192/3.25–3.33
See application file for complete search history.

(56) References Cited

U.S. PATENT DOCUMENTS 6,942,598 B2 *    9/2005    Kondo et al. ................ 477/169
7,073,647 B2 *    7/2006    Morise et al. ............. 192/3.29

FOREIGN PATENT DOCUMENTS

JP    2005-114069 A    4/2005

* cited by examiner

*Primary Examiner*—Richard M. Camby
(74) *Attorney, Agent, or Firm*—Sughrue Mion, PLLC (57) ABSTRACT

A powertrain control apparatus controls a powertrain including a lock-up clutch, and an engine, in which fuel supply is cut off, directly to an automatic transmission. The control apparatus includes a control unit that controls the engine so that fuel supply resumes in the engine and a setting unit that sets a hydraulic-pressure instruction value based on a temperature of a combustion chamber of the engine so that a time required to discharge the lock-up clutch is longer when the temperature of the combustion chamber is a first temperature than when the temperature of the combustion chamber is a second temperature which is higher than the first temperature, when the lock-up clutch is controlled to be brought to the disengaged state from the engaged state and the fuel supply to the engine is resumed. The lock-up clutch is then operated by hydraulic pressure corresponding to the hydraulic-pressure instruction value.

20 Claims, 11 Drawing Sheets

POWERTRAIN CONTROL APPARATUS AND METHOD

INCORPORATION BY REFERENCE

The disclosure of Japanese Patent Application No. 2006-108836 filed on Apr. 11, 2006, including the specification, drawings and abstract, is incorporated herein by reference in its entirety.

BACKGROUND OF THE INVENTION

1. Field of the Invention

The invention relates to a powertrain control apparatus and method. More particularly, the invention relates to a powertrain that includes a lock-up clutch that connects an engine directly to an automatic transmission.

2. Field of the Invention

A conventional automatic transmission is connected to an engine via a fluid coupling such as a torque converter. The torque converter transmits the driving force to the transmission through the fluid (e.g., oil) that circulates in the torque converter. Therefore, the rotational speed of the input shaft of the torque converter differs from the rotational speed of the output shaft of the torque converter. This may decrease the efficiency of transmitting the driving force. Accordingly, a lock-up clutch that mechanically connects the input shaft to the output shaft of the torque converter is generally provided.

To improve fuel efficiency, when the vehicle speed is equal to or above a predetermined speed while the vehicle is decelerating, the fuel supply is cut off, that is, fuel injection is stopped. If the vehicle speed decreases to the predetermined speed when the fuel supply is cut off, the fuel injection resumes (i.e., the fuel supply resumes). After the fuel supply resumes, engine speed increases. Therefore, if the lock-up clutch is engaged when the fuel injection resumes, a shock may occur, and drivability may deteriorate. Accordingly, the powertrain is controlled so that the lock-up clutch is disengaged when the fuel supply resumes.

Japanese Patent Application Publication No. 2005-114069 (JP-A-2005-114069) describes a lock-up clutch control apparatus for a vehicle. When the lock-up clutch is disengaged, the control apparatus sharply decreases the hydraulic pressure applied to the lock-up clutch. The control apparatus decreases the hydraulic pressure from a value at which the lock-up clutch is engaged to a value at which the process of disengaging the lock-up clutch starts (hereinafter, this value will be referred to as "disengagement initial value"). Then, the control apparatus gradually decreases the hydraulic pressure to a pressure where the lock-up clutch is completely disengaged. The control apparatus described in JP-A-2005-114069 includes a disengagement portion, and an initial-pressure setting portion. When the lock-up clutch is disengaged while the vehicle is decelerating, the disengagement portion outputs an instruction to sharply decrease the hydraulic pressure from the value at which the lock-up clutch is engaged to the disengagement initial value, and then the hydraulic pressure gradually decreases to the value at which the lock-up clutch is completely disengaged. The initial-pressure setting portion sets the disengagement initial value according to the inertial torque of the engine when the vehicle is decelerating.

In the control apparatus described in JP-A-2005-114069, if the lock-up clutch is disengaged while the vehicle is decelerating, the disengagement portion sharply decreases the hydraulic pressure from the value at which the lock-up clutch is engaged to the disengagement initial value. The initial-pressure setting portion sets the disengagement initial value according to a parameter relating to the inertial torque of the engine or the inertial torque of the engine crankshaft system when the vehicle is decelerating. For example, the disengagement initial value is set according to the deceleration of the vehicle, or the rate of change in the engine speed when the vehicle is decelerating, or a parameter relating to the deceleration or the rate of change in the engine speed. This reduces variations of the time at which the lock-up clutch is actually disengaged if the torque capacity required for the lock-up clutch varies due to variations in the inertial torque of the engine crankshaft system. Thus, the time required to actually disengage the lock-up clutch is made constant, regardless of the inertial torque of the engine crankshaft system, which may vary depending on the decelerating state of the vehicle, that is, regardless of the parameter relating to the inertial torque. As a result, it is possible to reduce the variations of the magnitude of any shock that may occur when the lock-up clutch is disengaged. Thus, drivability is appropriately improved.

If the lock-up clutch is disengaged when the fuel supply is resumed, if the combustibility of fuel is low, the engine speed may not increase, and may instead decrease. If the engine speed greatly decreases, the engine may stall. However, JP-A-2005-114069 does not consider the possibility that the engine speed decreases if the combustibility of fuel is low. Therefore, according to the described lock-up clutch control apparatus, the engine may stall when the lock-up clutch is disengaged.

SUMMARY OF THE INVENTION

The invention provides a powertrain control apparatus and method that suppresses a shock when fuel supply resumes, and suppresses an engine stall.

A first aspect of the invention relates to a powertrain control apparatus that controls a powertrain including a lock-up clutch. The lock-up clutch connects an engine, in which fuel supply is cut off, directly to an automatic transmission, and the lock-up clutch is operated by hydraulic pressure corresponding to a hydraulic-pressure instruction value. The control apparatus includes a control unit and a setting unit. The control unit controls the engine so that fuel supply resumes in the engine. The setting unit sets the hydraulic-pressure instruction value based on a temperature of a combustion chamber of the engine so that a time from when the lock-up clutch is in an engaged state till when the lock-up clutch is in a disengaged state is longer when the temperature of the combustion chamber is a first temperature than when the temperature of the combustion chamber is a second temperature which is higher than the first temperature, when the lock-up clutch is controlled to be brought to the disengaged state from the engaged state and the fuel supply to the engine is resumed.

According to the first aspect of the invention, the engine is controlled so that fuel supply resumes, that is, fuel injection resumes. The hydraulic-pressure instruction value is set based on the temperature of the combustion chamber of the engine so that the time from when the lock-up clutch is in the engaged state till when the lock-up clutch is in the disengaged state is longer when the temperature of the combustion chamber is a first temperature than when the temperature of the combustion chamber is a second temperature which is higher than the first temperature, when the lock-up clutch is controlled to be brought to the disengaged state from the engaged state and the fuel supply to the engine is resumed. Thus, when the temperature of the combustion chamber is low, and therefore it is estimated that the combustibility of fuel is low, the time at which the lock-up clutch is completely disengaged is delayed. This suppresses any decrease in the engine speed. As a result, it is possible to provide a powertrain control apparatus that disengages the lock-up clutch while suppressing an engine stall.

The powertrain control apparatus according to the second aspect of the invention is similar to the first aspect, except that the setting unit sets the hydraulic-pressure instruction value so that the hydraulic-pressure instruction value decreases from a value at which the lock-up clutch is engaged to a predetermined value, and then the hydraulic-pressure instruction value decreases to a value at which the lock-up clutch is disengaged at a predetermined rate; and the setting unit sets the hydraulic-pressure instruction value so that the time from when the lock-up clutch is in the engaged state till when the lock-up clutch is in the disengaged state is longer when the temperature of the combustion chamber is the first temperature than when the temperature of the combustion chamber is the second temperature which is higher than the first temperature, by setting at least one of the predetermined value and the predetermined rate based on the temperature of the combustion chamber.

According to the second aspect of the invention, the hydraulic-pressure instruction value is set so that the hydraulic-pressure instruction value decreases from the value at which the lock-up clutch is engaged to the predetermined value, and then the hydraulic-pressure instruction value decreases to the value at which the lock-up clutch is disengaged at the predetermined rate. At least one of the predetermined value and the predetermined rate is set based on the temperature of the combustion chamber. Thus, it is possible to set the hydraulic-pressure instruction value according to the temperature of the combustion chamber, while suppressing a sudden disengagement of the lock-up clutch.

The powertrain control apparatus according to a third aspect of the invention is similar to the first or second aspect, except that the temperature of the combustion chamber is determined based on the temperature of coolant of the engine.

According to the third aspect of the invention, the temperature of the coolant of the engine is used to determine the temperature of the combustion chamber. The temperature of the combustion chamber is correlated with the temperature of the coolant of the engine. Therefore, it is possible to set the hydraulic-pressure instruction value according to the temperature of the combustion chamber, that is, the combustibility of fuel, without directly measuring the temperature of the combustion chamber.

The powertrain control apparatus according to a fourth aspect of the invention is similar to the control apparatus according to the third aspect of the invention, except that the setting unit sets the hydraulic-pressure instruction value so that the time from when the lock-up clutch is in the engaged state till when the lock-up clutch is in the disengaged state increases as the temperature of the coolant decreases.

According to the fourth aspect of the invention, the hydraulic-pressure instruction value is set so that the time from when the lock-up clutch is in the engaged state till when the lock-up clutch is in the disengaged state increases as the temperature of the coolant decreases. Thus, when the temperature of the combustion chamber is low, and therefore it is estimated that the combustibility of fuel is low, the time at which the lock-up clutch is completely disengaged is delayed. This suppresses any decrease in the engine speed.

As a result, it is possible to provide a powertrain control apparatus, which disengages the lock-up clutch while suppressing an engine stall.

The powertrain control apparatus according to a fifth aspect of the invention is similar to the first or second aspects, except that the temperature of the combustion chamber is determined based on a period over which the fuel supply is cut off.

According to the fifth aspect of the invention, the period of time over which the fuel supply is cut off is used to determine the temperature of the combustion chamber. The temperature of the combustion chamber is correlated with the period of time over which the fuel supply is cut off (i.e., the period in which the fuel injection is stopped). Therefore, it is possible to set the hydraulic-pressure instruction value according to the temperature of the combustion chamber, that is, the combustibility of fuel, without directly measuring the temperature of the combustion chamber.

The powertrain control apparatus according to a sixth aspect of the invention is similar to the fifth aspect, except that the setting unit sets the hydraulic-pressure instruction value so that the time from when the lock-up clutch is in the engaged state till when the lock-up clutch is in the disengaged state increases as the period over which the fuel supply is cut off increases.

According to the sixth aspect of invention, the hydraulic-pressure instruction value is set so that the time from when the lock-up clutch is in the engaged state till when the lock-up clutch is in the disengaged state increases as the period over which the fuel supply is cut off increases. Thus, when the temperature of the combustion chamber is low, and therefore it is estimated that the combustibility of fuel is low, the timing at which the lock-up clutch is completely disengaged is delayed. This suppresses any decrease in the engine speed. As a result, it is possible to provide a powertrain control apparatus that disengages the lock-up clutch while suppressing an engine stall.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENTS

Hereinafter, embodiments of the invention will be described in detail with reference to the drawings. In the following description, the same components are denoted by the same reference numerals, and have the same names and the same functions. Therefore, redundant description thereof will be omitted.

The powertrain of a vehicle in which a control apparatus according to a first embodiment of the invention is provided will be described with reference to FIG. 1. The control apparatus according to the embodiment may be realized, for example, when an ECU (electronic control unit) 1000 shown in FIG. 1 executes programs.

Figure 1:
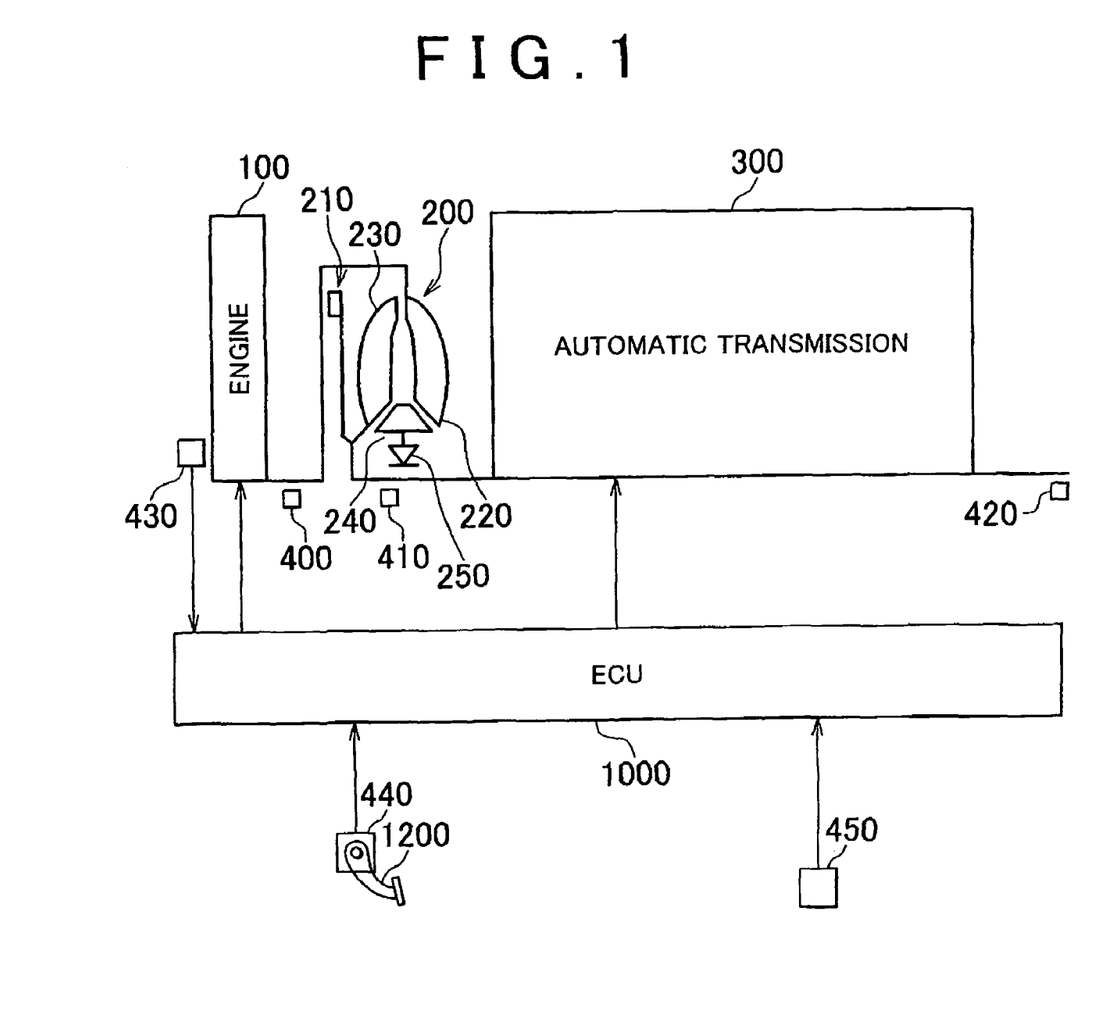
FIG. 1 is a schematic diagram showing the power train of a vehicle in which a control apparatus according to a first embodiment is provided.

As shown in FIG. 1, the powertrain of the vehicle includes an engine 100, a torque converter 200, an automatic transmission 300, and an ECU 1000.

The output shaft of the engine 100 is connected to the input shaft of the torque converter 200. That is, the engine 100 is connected to the torque convert 200 by the rotational shafts. Accordingly, the rotational speed NE of the output shaft of the engine 100 (i.e., engine speed NE) detected by an engine speed sensor 400 is equal to the rotational speed of the input shaft of the torque converter 200 (i.e., the rotational speed of a pump impeller).

The torque converter 200 includes a lock-up clutch 210 that directly connects the input shaft to the output shaft; the pump impeller 220 on the input-shaft side; a turbine runner 230 on the output-shaft side; and a stator 240 that includes a one-way clutch 250, and that amplifies torque.

The torque converter 200 is connected to the automatic transmission 300 by the rotational shafts. A turbine speed sensor 410 detects the rotational speed NT of the output shaft of the torque converter 200 (i.e., the turbine speed NT). An output-shaft speed sensor 420 detects the rotational speed NOUT of the output shaft of the automatic transmission 300.

The automatic transmission 300 may be a transmission having a plurality of speeds, which includes a planetary gear unit. Alternatively, the automatic transmission 300 may be a continuously variable transmission that continuously changes the speed ratio.

The ECU 1000 receives a signal that indicates the engine speed NE from the engine speed sensor 400, a signal that indicates the turbine speed NT from the turbine speed sensor 410, a signal that indicates the rotational speed NOUT from the output-shaft speed sensor 420, a signal that indicates the temperature of coolant of the engine 100 from a coolant-temperature sensor 430, a signal that indicates the operation amount of an accelerator pedal 1200 from an accelerator-pedal operation amount sensor 440, and a signal that indicates a vehicle speed from a vehicle-speed sensor 450.

The ECU 1000 controls the engine 100, lock-up clutch 210, automatic transmission 300, and the like based on these signals.

Figure 4:
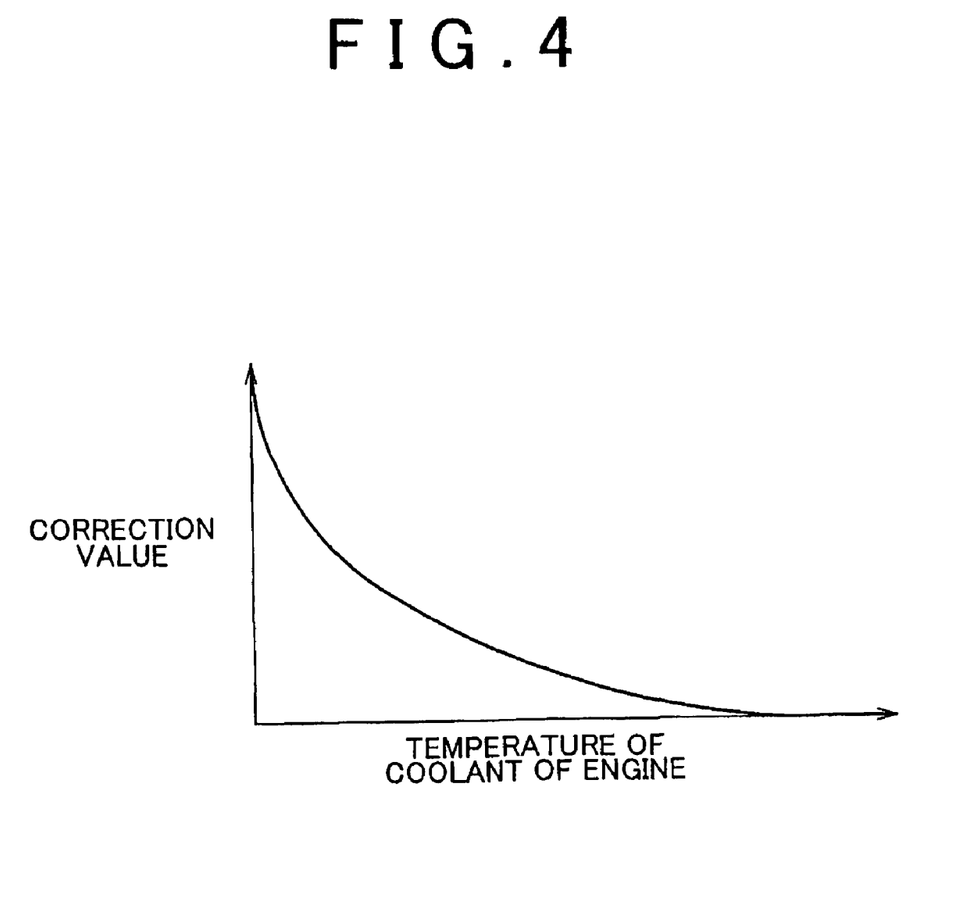
FIG. 4 is a diagram showing the relation between the temperature of coolant of an engine, and a correction value for a disengagement initial value.

A hydraulic circuit 500 will be described with reference to FIG. 2. The hydraulic circuit 500 regulates the hydraulic pressure supplied to the torque converter 200 to control the lock-up clutch 210. FIG. 4 shows only a part of the hydraulic circuit 500 that relates to the invention.

The hydraulic circuit 500 includes an oil pump 510, a primary regulator valve 520, a secondary regulator valve 530, a solenoid modulator valve 540, and a lock-up control valve 550.

The oil pump 510 is connected to the crankshaft of the engine 100. When the crankshaft rotates, the oil pump 510 draws automatic transmission fluid (ATF) accumulated in an oil pan 512, thereby generating hydraulic pressure. The primary regulator valve 520 regulates the hydraulic pressure generated by the oil pump 510, thereby generating line pressure.

The excess transmission fluid discharged from the primary regulator valve 520 flows into the secondary regulator valve 530. The secondary regulator valve 530 generates the secondary pressure.

The solenoid modulator valve 540 generates solenoid-modulator pressure using the line pressure as the original pressure. The solenoid-modulator pressure is supplied to a duty solenoid 560.

A lock-up control valve 550 selectively supplies the secondary pressure to the engagement-side oil chamber of the torque converter 200 (i.e., the oil chamber on the pump impeller 220-side), or the disengagement-side oil chamber of the torque converter 200 (i.e., the space defined by the lock-up clutch 210 and a converter cover 260).

The lock-up control valve 550 operates using the hydraulic pressure supplied from the duty solenoid 560 as pilot pressure. When the hydraulic pressure is not supplied to the lock-up control valve 550 from the duty solenoid 560, the spool of the lock-up control valve 550 is in the position shown on the left side (1) in FIG. 2.

In this case, the secondary pressure is supplied to the disengagement-side oil chamber of the torque converter 200, and the hydraulic pressure in the engagement-side oil chamber of the torque converter 200 is supplied to an oil cooler (not shown). As a result, the lock-up clutch 210 is separated from the converter cover 260, and the lock-up clutch 210 is disengaged.

Figure 2:
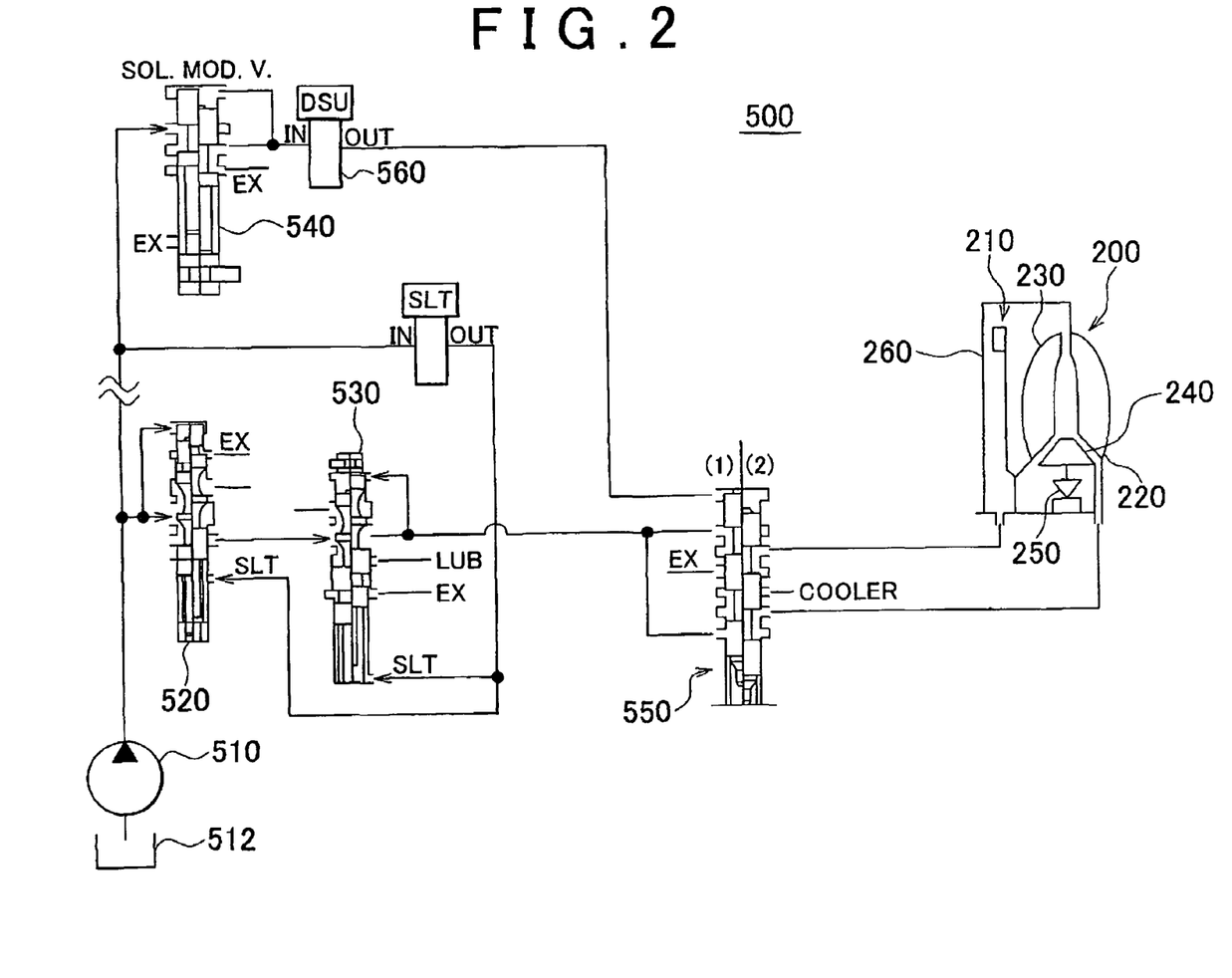
FIG. 2 is a diagram showing a hydraulic circuit that regulates hydraulic pressure supplied to a torque converter to control a lock-up clutch.

When the hydraulic pressure is supplied to the lock-up control valve 550 from the duty solenoid 560, the spool of the lock-up control valve 550 is in the position shown on the right side (2) in FIG. 2.

In this case, the secondary pressure is supplied to the engagement-side oil chamber of the torque converter 200, and the hydraulic pressure is drained from the disengagement-side oil chamber of the torque converter 200. As a result, the lock-up clutch 210 is pressed to the converter cover 260, and the lock-up clutch 210 is engaged.

The engagement pressure for the lock-up clutch 210 (i.e., the hydraulic pressure that engages the lock-up clutch 210) changes according to the difference in hydraulic pressure between the engagement-side oil chamber and the disengagement-side oil chamber in the torque converter 200.

The difference in hydraulic pressure between the engagement-side oil chamber and the disengagement-side oil chamber changes according to the hydraulic pressure supplied to the lock-up control valve 550 from the duty solenoid 560.

The duty solenoid 560 outputs the pressure according to an instruction duty value transmitted from the ECU 1000.

The instruction duty value is output so that the difference in hydraulic pressure between the engagement-side oil chamber and the disengagement-side oil chamber is equal to a hydraulic-pressure instruction value set in the ECU 1000.

The control structure of a program executed by the ECU 1000 according to the embodiment will be described with reference to FIG. 3.

In step S100, the ECU 1000 determines whether the condition for cutting off fuel supply is satisfied. The condition for cutting off the fuel supply may be satisfied, for example, when the vehicle speed is higher than a threshold value, and the operation amount of the accelerator pedal is "0" (the engine 100 is idling). If the condition is satisfied (YES in step S100), the routine proceeds to step S110. If the condition is not satisfied (NO in step S100), the routine ends. In step S110, the ECU 1000 cuts off the fuel supply.

In step S200, the ECU 1000 determines whether the condition for resuming the fuel supply is satisfied. The condition for resuming the fuel supply may be satisfied, for example, when the vehicle speed is lower than or equal to the threshold value. If the condition for resuming the fuel supply is satisfied (YES in step S200), the routine proceeds to step S300. If the condition for resuming the fuel supply is not satisfied (NO in step S200), the routine returns to S200.

In step S300, the ECU 1000 sets a disengagement initial value based on the temperature of the coolant of the engine 100. The disengagement initial value is set by adding a correction value to the reference value. As shown in the map in FIG. 4, the correction value is increased as the temperature of the coolant decreases. That is, the disengagement initial value is increased as the temperature of the coolant decreases. The disengagement initial value is regarded as the predetermined value in the second aspect of the invention.

Figure 3:
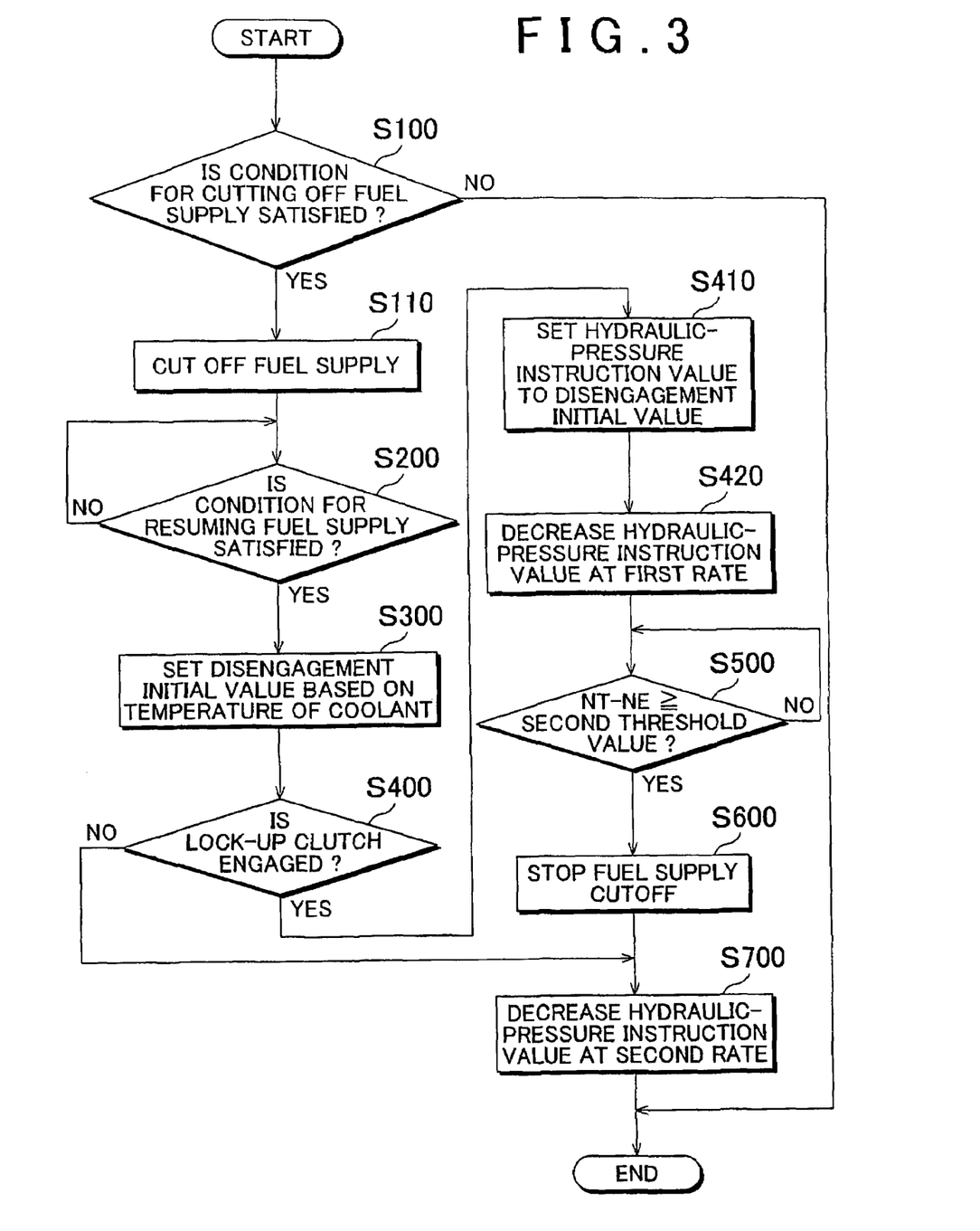
FIG. 3 is a flowchart showing the control structure of a program executed by an ECU according to the first embodiment.

As shown in FIG. 3, in step S400, the ECU 1000 determines whether the lock-up clutch 210 is engaged, for example, based on whether the difference between the engine speed NE and the turbine speed NT is smaller than or equal to a first threshold value. If it is determined that the lock-up clutch 210 is engaged (YES in step S400), the routine proceeds to step S410. If it is determined that the lock-up clutch 210 is not engaged (NO in step S400), the routine proceeds to step S700.

In step S410, the ECU 1000 sets the hydraulic-pressure instruction value to the disengagement initial value. That is, the difference in hydraulic pressure between the engagement-side oil chamber and the disengagement-side oil chamber in the torque converter 200 decreases to the disengagement initial value.

In step S420, the ECU 1000 decreases the hydraulic-pressure instruction value at a predetermined first rate. That is, the difference in hydraulic pressure between the engagement-side oil chamber and the disengagement-side oil chamber in the torque converter 200 decreases at the predetermined first rate.

In step S500, the ECU 1000 determines whether the difference between the engine speed NE and the turbine speed NT is greater than or equal to a second threshold value. If the difference between the engine speed NE and the turbine speed NT is greater than or equal to the second threshold value (YES in step S500), the routine proceeds to step S600. If the difference is less than the second threshold value (NO in step S500), the routine returns to step S500.

In step S600, the ECU 1000 stops the fuel supply cutoff, that is, the fuel injection resumes.

In step S700, the ECU 1000 decreases the hydraulic-pressure instruction value to a value at which the lock-up clutch 210 is completely disengaged at a predetermined second rate. That is, the difference in hydraulic pressure between the engagement-side oil chamber and the disengagement-side oil chamber in the torque converter 200 decreases at the predetermined second rate. When the hydraulic-pressure instruction value decreases at the second rate, the hydraulic-pressure instruction value decreases more quickly than when the hydraulic-pressure instruction value decreases at the first rate. However, the second rate is not limited to a faster rate.

The operation of the ECU 1000 based on the above-described structure and flowchart will be described. The ECU 1000 is the control apparatus according to the embodiment.

If the condition for cutting off the fuel supply when the vehicle is moving is satisfied, for example, when the vehicle is decelerating (YES in step S100), the fuel supply is cut off (S110). Then, if the condition for resuming the fuel supply is satisfied (YES in step S200), the fuel supply eventually resumes.

After the fuel supply cutoff is stopped, and the fuel injection resumes, the engine speed NE increases. If the lock-up clutch 210 is engaged when the engine speed NE increases, a shock occurs. Accordingly, it is desirable to disengage the lock-up clutch 210 when the fuel supply resumes.

Figure 5:
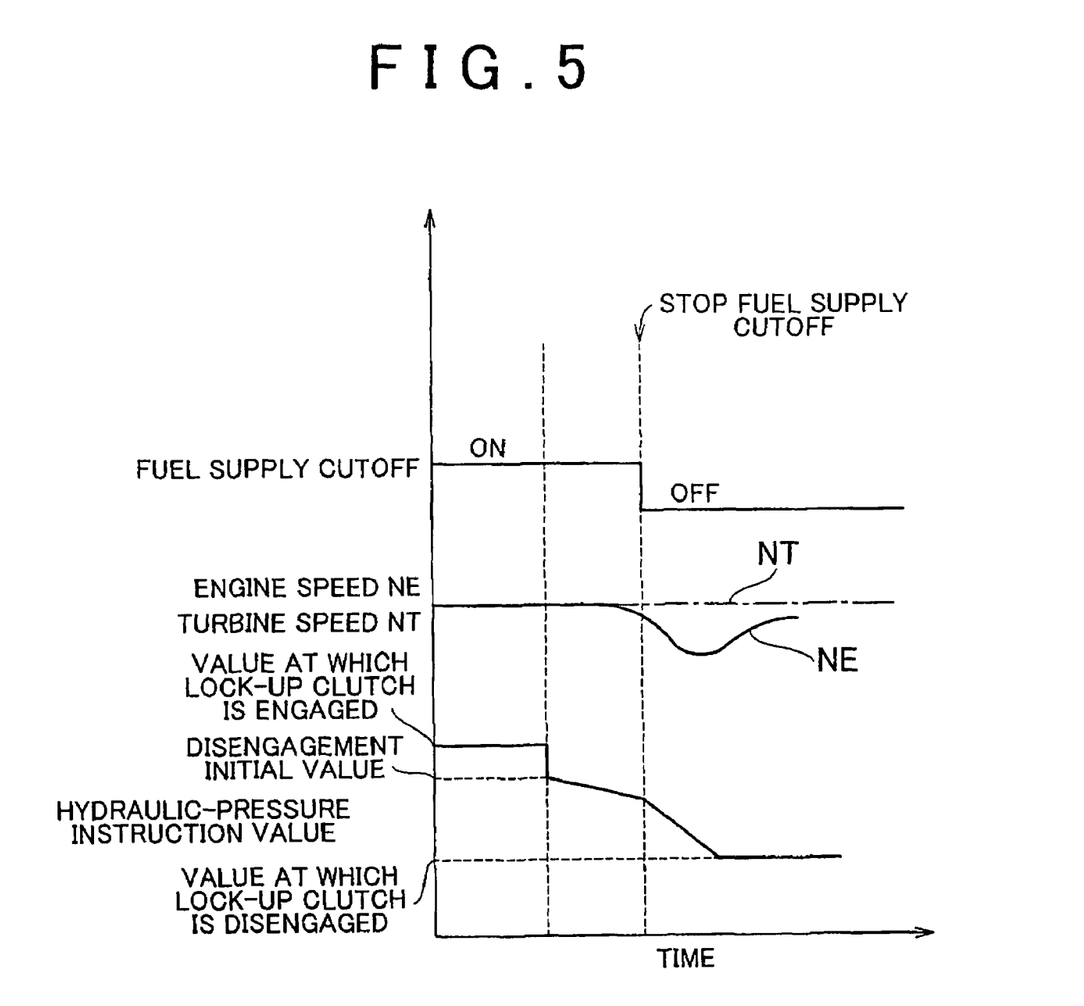
FIG. 5 is a timing chart showing the change in a hydraulic-pressure instruction value.

If the lock-up clutch 210 is engaged (YES in step S400), as shown in FIG. 5, the hydraulic-pressure instruction value is set to the disengagement initial value (S410), and the difference in hydraulic pressure between the engagement-side oil chamber and the disengagement-side oil chamber in the torque converter 200 decreases to the disengagement initial value. As a result, the process of disengaging the lock-up clutch 210 starts.

Further, the hydraulic-pressure instruction value decreases at the predetermined first rate (S420). Thus, the difference in hydraulic pressure between the engagement-side oil chamber and the disengagement-side oil chamber in the torque converter 200 decreases. When the difference in hydraulic pressure is so small that the lock-up clutch 210 slips, the engine speed NE is lower than the turbine speed NT, as shown in FIG. 5.

When the hydraulic-pressure instruction value is further decreased to decrease the difference in hydraulic pressure, and the difference between the engine speed NE and the turbine speed NT is greater than or equal to the second threshold value (YES in step S500), the fuel supply cutoff is stopped (S600). Thus, the fuel injection resumes. Then, the hydraulic-pressure instruction value quickly decreases to a value at which the lock-up clutch 210 is disengaged at the predetermined second rate (S700).

At this time, if the temperature of the combustion chamber of the engine 100 is sufficiently high, and the combustibility of fuel is high, the engine speed NE increases quickly. In this case, there is a low possibility that the engine speed NE is greatly decreased, and the engine 100 is stalled due to the disengagement of the lock-up clutch 210.

In contrast, if the temperature of the combustion chamber of the engine 100 is low, and the combustibility of fuel is low, the engine speed NE does not increase quickly. In this case, the engine speed NE may be greatly decreased, and the engine 100 may stall when the lock-up clutch 210 is disengaged.

Accordingly, in this embodiment, the disengagement initial value is set based on the temperature of the coolant of the engine 100 that is closely correlated with the temperature of the combustion chamber (S300). The disengagement initial value is set to increase as the temperature of the coolant of the engine 100 decreases.

Thus, when the temperature of the coolant is low, and therefore it is estimated that the temperature of the combustion chamber is low, the disengagement initial value is set to be high, as compared to when the temperature of the combustion chamber is high. This extends the time from when the process of disengaging the lock-up clutch 210 starts until when the lock-up clutch 210 is completely disengaged. As a result, it is possible to suppress a decrease in the engine speed NE, and to keep the engine 100 from stalling.

As described above, the ECU, which is the control apparatus according to the embodiment, sets the hydraulic-pressure instruction value to the disengagement initial value when the lock-up clutch is controlled to be disengaged and the fuel supply resumes in the engine. Then, the ECU decreases the hydraulic-pressure instruction value to the value at which the lock-up clutch is completely disengaged at the predetermined rate. The disengagement initial value is set to increase as the temperature of the coolant of the engine decreases. This increases the time from when the process of disengaging the lock-up clutch starts until when the lock-up clutch is completely disengaged, in the case where the time from when the fuel supply (fuel injection) resumes until when the engine speed NE starts increasing is long due to a low combustibility of fuel. Thus, a decrease in the engine speed NE can be suppressed. As a result, an engine stall can be suppressed.

Hereinafter, a second embodiment of the invention will be described. The second embodiment differs from the first embodiment in that the disengagement initial value is set based on the period in which the fuel supply is continuously cut off (hereinafter, referred to as "fuel-cutoff period"), instead of setting the disengagement initial value based on the temperature of the coolant of the engine 100. Other portions of the structure are the same as those in the first embodiment. The functions thereof are the same as in the first embodiment. Accordingly, the detailed description thereof will be omitted.

Figure 6:
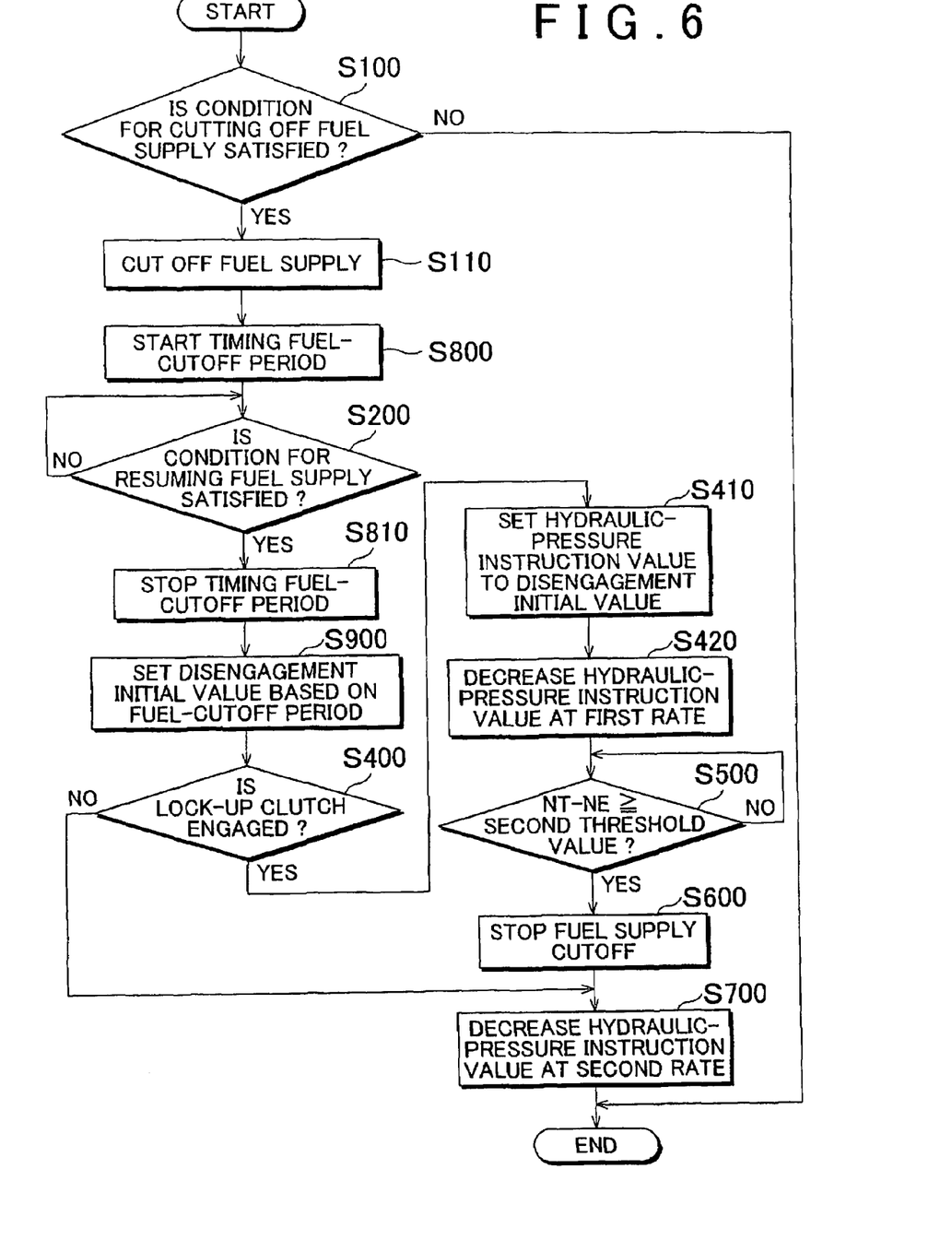
FIG. 6 is a flowchart showing the control structure of a program executed by an ECU according to a second embodiment.

The control structure of a program executed by the ECU 1000 according to the embodiment will be described with reference to FIG. 6. The same processes as in the first embodiment are denoted by the same step numbers. Therefore, the detailed description thereof will be omitted.

In step S800, the ECU 1000 starts timing the fuel-cutoff period. In step S810, the ECU 1000 stops timing the fuel-cutoff period.

Figure 7:
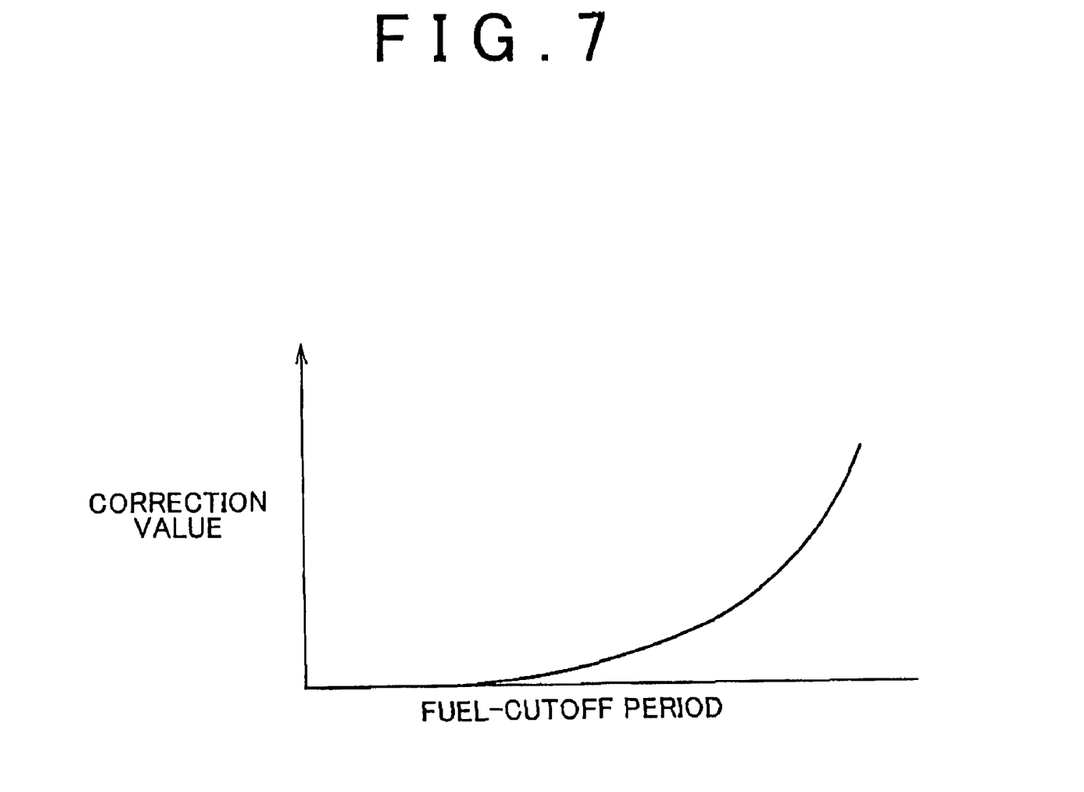
FIG. 7 is a diagram showing the relation between a fuel-cutoff period and the correction value for the disengagement initial value.

In step S900, the ECU 1000 sets the disengagement initial value based on the fuel-cutoff period. The disengagement initial value is set by adding the correction value to the reference value. As shown in the map in FIG. 7, the correction value is set to increase as the fuel-cutoff period increases. That is, the disengagement initial value is set to increase as the fuel-cutoff period increases.

The operation of the ECU 1000 based on the above-described structure and flowchart will be described. The ECU 1000 is the control apparatus according to the embodiment.

The temperature of the combustion chamber decreases as the fuel-cutoff period increases. Thus, when the fuel supply is cut off (S110), the ECU 1000 starts timing the fuel-cutoff period (step S800). If the condition for resuming the fuel supply is satisfied (YES in step S200), the ECU 1000 stops timing the fuel-cutoff period (S810).

The disengagement initial value is set to increase as the timed period increases (S900). Thus, it is possible to obtain the same effects as those obtained in the first embodiment.

Hereinafter, a third embodiment of the invention will be described. The third embodiment differs from the first embodiment in that the first rate and second rate, at which the hydraulic-pressure instruction value changes, are set based on the temperature of the coolant of the engine 100, instead of setting the disengagement initial value. Other portions of the structure are the same as those in the first embodiment. The functions thereof are same as in the first embodiment. Accordingly, the detailed description thereof will be omitted.

Figure 8:
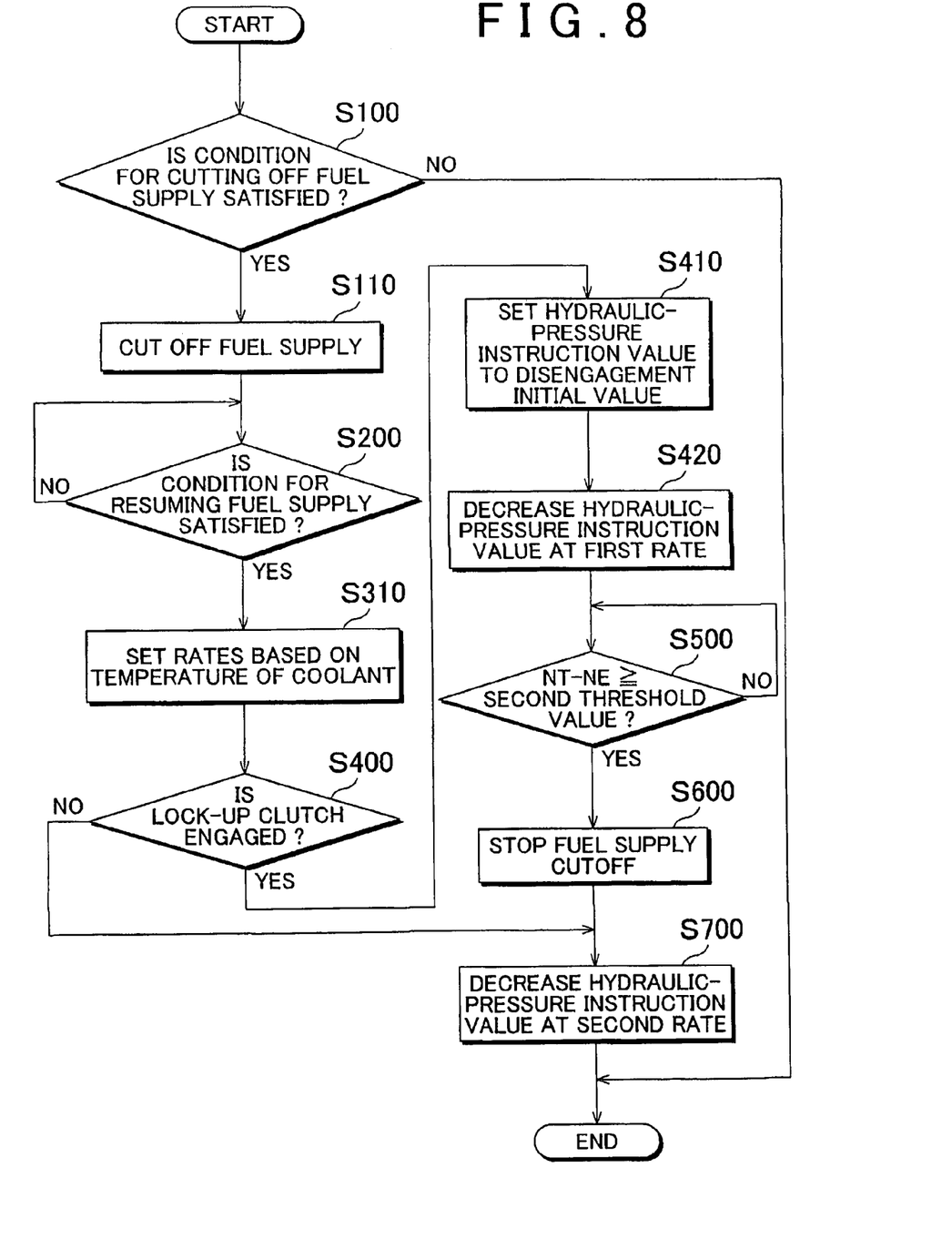
FIG. 8 is a flowchart showing the control structure of a program executed by the ECU according to a third embodiment.

The control structure of a program executed by the ECU 1000 will be described with reference to FIG. 8. The same processes as in the first embodiment are denoted by the same step numbers. Therefore, the detailed description thereof will be omitted.

Figure 9:
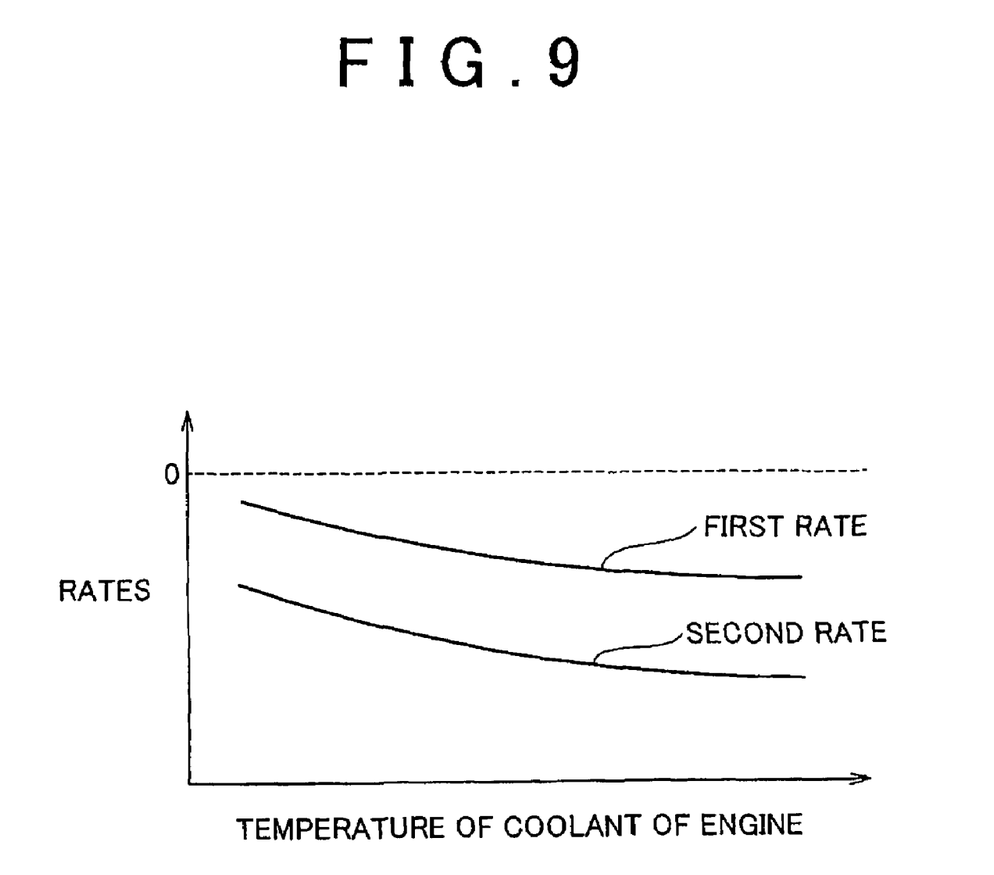
FIG. 9 is a diagram showing the relation between the temperature of the coolant of the engine and rates at which a hydraulic-pressure instruction value changes.

In step S310, the ECU 1000 sets the first rate and second rate based on the temperature of the coolant of the engine 100. As shown in the map in FIG. 9, the first rate and second rate are set to negative values. Also, the first rate and second rate are set to increase as the temperature of the coolant decreases. In this embodiment, because each rate is set to a negative value, the hydraulic-pressure instruction value decreases. Accordingly, as the value of each rate increases, the hydraulic-pressure instruction value decreases to a smaller extent. That is, as the value of each rate increases, the hydraulic-pressure instruction value decreases more slowly.

The operation of the ECU 1000 based on the above-described structure and flowchart will be described. The ECU 1000 is the control apparatus according to the embodiment.

After the fuel supply is cut off (S110), if the condition for resuming the fuel supply is satisfied (YES in step S200), the first rate and second rate are set based on the temperature of the coolant of the engine 100 (S310). The first rate and second rate are set so that the hydraulic-pressure instruction value decreases more slowly as the temperature of the coolant decreases.

After the hydraulic-pressure instruction value is set to the disengagement initial value, the hydraulic-pressure instruction value decreases at the first rate (S420). After the fuel supply cutoff is stopped, the hydraulic-pressure instruction value decreases at the second rate (S700).

Thus, when the temperature of the coolant is low, and therefore it is estimated that the temperature of the combustion chamber is low, the lock-up clutch 210 is disengaged more slowly, as compared to when the temperature of the combustion chamber is high. This increases the time from when the process of disengaging the lock-up clutch 210 starts until when the lock-up clutch 210 is completely disengaged. As a result, it is possible to suppress a decrease in the engine speed NE, and to suppress the stall of the engine 100.

Hereinafter, a fourth embodiment of the invention will be described. The fourth embodiment differs from the second embodiment in that the first rate and second rate are set based on the fuel-cutoff period, instead of setting the disengagement initial value. Other portions of the structure are the same as those in the second embodiment. The functions thereof are the same as in the second embodiment. Accordingly, the detailed description thereof will be omitted.

Figure 10:
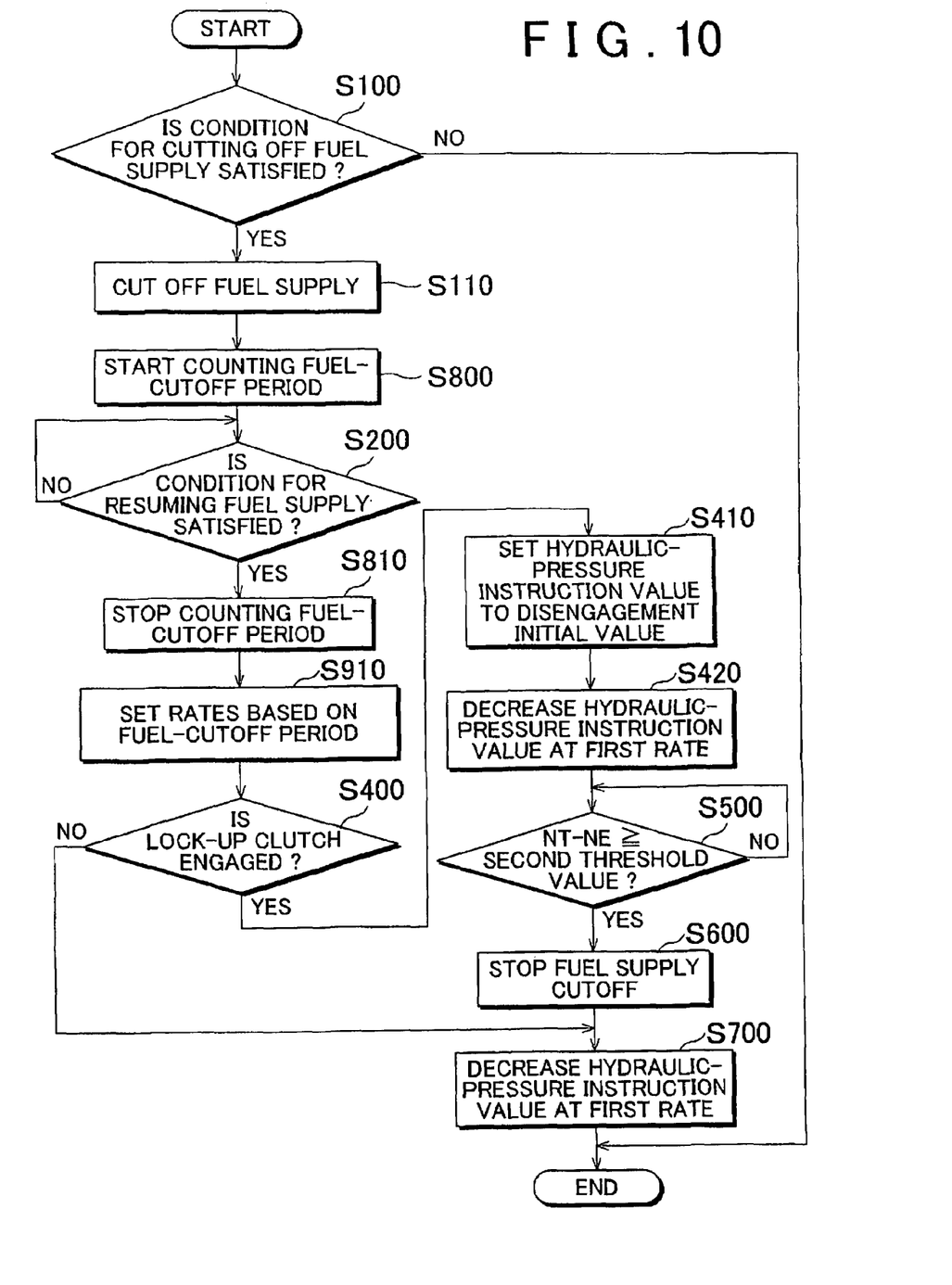
FIG. 10 is a flowchart showing the control structure of a program executed by the ECU according to a fourth embodiment.

The control structure of a program executed by the ECU 1000 according to the embodiment will be described with reference to FIG. 10. The same processes as in the first and second embodiments are denoted by the same step numbers. Therefore, the detailed description thereof will be omitted.

Figure 11:
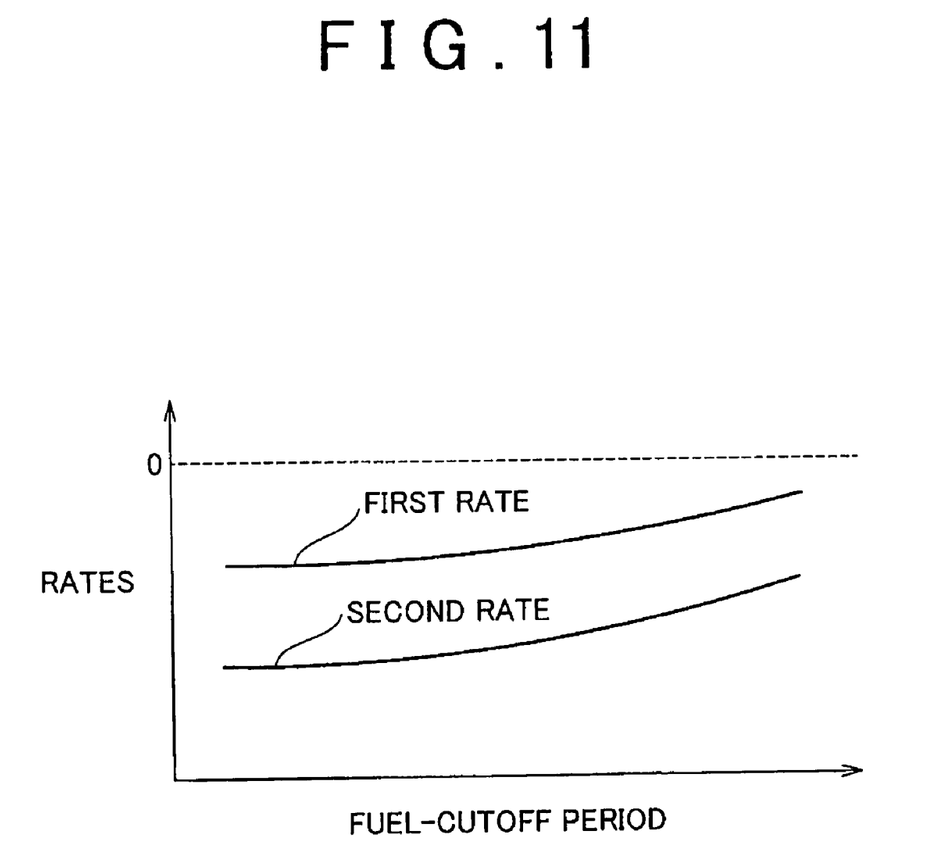
FIG. 11 is a diagram showing the relation between the fuel-cutoff period and the rates at which the hydraulic-pressure instruction value changes.

In step S910, the ECU 1000 sets the first rate and second rate based on the fuel-cutoff period. As shown in the map in FIG. 11, the first rate and second rate are set to negative values. Also, the first rate and second rate are set to increase as the fuel-cutoff period increases. In this embodiment, because each rate is set to a negative value, the hydraulic-pressure instruction value decreases. Accordingly, as the value of each rate increases, the hydraulic-pressure instruction value decreases to a smaller extent. That is, as the value of each rate increases, the hydraulic-pressure instruction value decreases more slowly.

The operation of the ECU 1000 based on the above-described structure and flowchart will be described. The ECU 1000 is the control apparatus according to the embodiment.

After the fuel supply is cut off (S110), the ECU 1000 starts timing the fuel-cutoff period (S800). Then, if the condition for resuming the fuel supply is satisfied (YES in step S200), the ECU 1000 stops timing the fuel-cutoff period (S810). Then, the first rate and second rate are set based on the fuel-cutoff period (S910). The first rate and second rate are set so that the hydraulic-pressure instruction value decreases more slowly as the fuel-cutoff period increases.

After the hydraulic-pressure instruction value is set to the disengagement initial value, the hydraulic-pressure instruction value decreases at the first rate (S420). After the fuel supply cutoff is stopped, the hydraulic-pressure instruction value decreases at the second rate (S700).

Thus, when the fuel-cutoff period is long, and therefore it is estimated that the temperature of the combustion chamber is low, the lock-up clutch 210 is disengaged more slowly, as compared to when the temperature of the combustion chamber is high. This increases the time from when the process of disengaging the lock-up clutch 210 starts until when the lock-up clutch 210 is completely disengaged. Also, the amount by which the lock-up clutch 210 slips is reduced. As a result, it is possible to suppress a decrease in the engine speed NE, and to suppress the stall of the engine 100.

Alternatively, in each of the first to fourth embodiments, the temperature of the combustion chamber that is directly measured may be used, instead of the temperature of the coolant of the engine 100 or the fuel-cutoff period.

The embodiment of the invention that has been disclosed in the specification is to be considered in all respects as illustrative and not restrictive. The technical scope of the invention is defined by claims, and all changes that come within the meaning and range of equivalency of the claims are intended to be embraced therein.

What is claimed is:

1. A powertrain control apparatus for a power train that includes a lock-up clutch that directly connects an engine, in which fuel supply is cut off, to an automatic transmission, wherein the lock-up clutch is operated by hydraulic pressure corresponding to a hydraulic-pressure instruction value, the control apparatus comprising:
a control unit that controls the engine so that fuel supply to the engine resumes; and
a setting unit that sets the hydraulic-pressure instruction value based on a temperature of a combustion chamber of the engine so that a time from when the lock-up clutch is in an engaged state till when the lock-up clutch is in a disengaged state is longer when the temperature of the combustion chamber is a first temperature than when the temperature of the combustion chamber is a second temperature which is higher than the first temperature, when the lock-up clutch is controlled to be brought to the disengaged state from the engaged state and the fuel supply to the engine is resumed.

2. The powertrain control apparatus according to claim 1, further comprising:
a temperature detector that detects the temperature of the combustion chamber, and wherein the setting unit increases the time from when the lock-up clutch is in the engaged state till when the lock-up clutch is in the disengaged state as the detected temperature of the combustion chamber decreases.

3. The powertrain control apparatus according to claim 1, wherein the temperature of the combustion chamber is determined based on a value relating to the temperature of the combustion chamber.

4. The powertrain control apparatus according to claim 3, wherein the value relating to the temperature of the combustion chamber is a temperature of coolant of the engine.

5. The powertrain control apparatus according to claim 4, wherein the setting unit increases the time from when the lock-up clutch is in the engaged state till when the lock-up clutch is in the disengaged state as the temperature of the coolant decreases.

6. The powertrain control apparatus according to claim 1, wherein the setting unit sets the hydraulic-pressure instruction value so that the hydraulic-pressure instruction value decreases from a value at which the lock-up clutch is engaged to a predetermined value, and then the hydraulic-pressure instruction value decreases to a value at which the lock-up clutch is disengaged at a predetermined rate; and the setting unit sets the hydraulic-pressure instruction value so that the time from when the lock-up clutch is in the engaged state till when the lock-up clutch is in the disengaged state is longer when the temperature of the combustion chamber is the first temperature than when the temperature of the combustion chamber is the second temperature, by setting at least one of the predetermined value and the predetermined rate based on the temperature of the combustion chamber.

7. The powertrain control apparatus according to claim 1, wherein the temperature of the combustion chamber is determined based on a temperature of coolant of the engine.

8. The powertrain control apparatus according to claim 7, wherein the setting unit sets the hydraulic-pressure instruction value so that the time from when the lock-up clutch is in the engaged state till when the lock-up clutch is in the disengaged state increases as the temperature of the coolant decreases.

9. The powertrain control apparatus according to claim 1, wherein the temperature of the combustion chamber is determined based on a period over which the fuel supply is cut off.

10. The powertrain control apparatus according to claim 9, wherein the setting unit sets the hydraulic-pressure instruction value so that the time from when the lock-up clutch is in the engaged state till when the lock-up clutch is in the disengaged state increases as the period over which the fuel supply is cut off increases.

11. A method of controlling a powertrain that includes a lock-up clutch that directly connects an engine, in which fuel supply is cut off, to an automatic transmission, wherein the lock-up clutch is operated by hydraulic pressure corresponding to a hydraulic-pressure instruction value, the control method comprising:
controlling the engine so that fuel supply to the engine resumes; and
setting the hydraulic-pressure instruction value based on a temperature of a combustion chamber of the engine so that a time from when the lock-up clutch is in an engaged state till when the lock-up clutch is in a disengaged state is longer when the temperature of the combustion chamber is a first temperature than when the temperature of the combustion chamber is a second temperature which is higher than the first temperature, when the lock-up clutch is controlled to be brought to the disengaged state from the engaged state and the fuel supply to the engine is resumed.

12. The powertrain control method according to claim 11, further comprising:
   detecting the temperature of the combustion chamber, and wherein the time from when the lock-up clutch is in the engaged state till when the lock-up clutch is in the disengaged state increases as the detected temperature of the combustion chamber decreases.

13. The powertrain control method according to claim 11, wherein the temperature of the combustion chamber is determined based on a value relating to the temperature of the combustion chamber.

14. The powertrain control method according to claim 13, wherein the value relating to the temperature of the combustion chamber is a temperature of coolant of the engine.

15. The powertrain control method according to claim 14, wherein the time from when the lock-up clutch is in the engaged state till when the lock-up clutch is in the disengaged state increases as the temperature of the coolant decreases.

16. The powertrain control method according to claim 11, wherein, in the setting step, the hydraulic-pressure instruction value is set so that the hydraulic-pressure instruction value decreases from a value at which the lock-up clutch is engaged to a predetermined value, and then the hydraulic-pressure instruction value decreases to a value at which the lock-up clutch is disengaged at a predetermined rate; and the hydraulic-pressure instruction value is set so that the time from when the lock-up clutch is in the engaged state till when the lock-up clutch is in the disengaged state is longer when the temperature of the combustion chamber is a first temperature than when the temperature of the combustion chamber is a second temperature which is higher than the first temperature, by setting at least one of the predetermined value and the predetermined rate based on the temperature of the combustion chamber.

17. The powertrain control method according to claim 11, wherein the temperature of the combustion chamber is determined based on a temperature of coolant of the engine.

18. The powertrain control method according to claim 17, wherein the hydraulic-pressure instruction value is set so that the time from when the lock-up clutch is in the engaged state till when the lock-up clutch is in the disengaged state increases as the temperature of the coolant decreases.

19. The powertrain control method according to claim 11, wherein the temperature of the combustion chamber is determined based on a period over which the fuel supply is cut off.

20. The powertrain control method according to claim 19, wherein the hydraulic-pressure instruction value is set so that the time from when the lock-up clutch is in the engaged state till when the lock-up clutch is in the disengaged state increases as the period over which the fuel supply is cut off increases.

* * * * *